(12) United States Patent
Scholz

(10) Patent No.: US 10,302,243 B1
(45) Date of Patent: May 28, 2019

(54) SUPPORT ASSEMBLY FOR ENGAGING A SMALL ELECTRONIC DEVICE

(71) Applicant: Charles W Scholz, San Antonio, TX (US)

(72) Inventor: Charles W Scholz, San Antonio, TX (US)

( * ) Notice: Subject to any disclaimer, the term of this patent is extended or adjusted under 35 U.S.C. 154(b) by 0 days.

(21) Appl. No.: 15/440,021

(22) Filed: Feb. 23, 2017

Related U.S. Application Data

(60) Provisional application No. 62/298,669, filed on Feb. 23, 2016, provisional application No. 62/299,190, filed on Feb. 24, 2016.

(51) Int. Cl.
*A47B 97/04* (2006.01)
*F16M 11/10* (2006.01)
*A47B 23/04* (2006.01)

(52) U.S. Cl.
CPC ............ *F16M 11/10* (2013.01); *A47B 23/04* (2013.01)

(58) Field of Classification Search
CPC .................................. A45C 5/03; F16M 11/10
See application file for complete search history.

(56) References Cited

U.S. PATENT DOCUMENTS

| | | | | |
|---|---|---|---|---|
| 6,065,916 A | * | 5/2000 | Swensen | B60P 7/0815 410/35 |
| 7,775,356 B2 | * | 8/2010 | Palmer | A45C 5/03 206/320 |
| 8,162,283 B1 | * | 4/2012 | Royz | F16M 11/10 248/455 |
| 2009/0178938 A1 | * | 7/2009 | Palmer | A45C 5/03 206/45.23 |
| 2011/0062045 A1 | * | 3/2011 | Kim | A45C 13/02 206/522 |

* cited by examiner

*Primary Examiner* — Amy J. Sterling
(74) *Attorney, Agent, or Firm* — Jackson Walker, LLP

(57) ABSTRACT

A support assembly for engaging a small electronic device. The support assembly comprises a stand having a base and a pivot leg assembly. The base receives a soft resilient pad, such as a foam pad. The pad has multiple raised areas. When the support stand is placed on a support surface such that the base is at an angle to the support surface, the small electronic device can be placed on the pad without sliding. In other words, the pad provides a non-slip surface to hold the small electronic device in place.

20 Claims, 11 Drawing Sheets

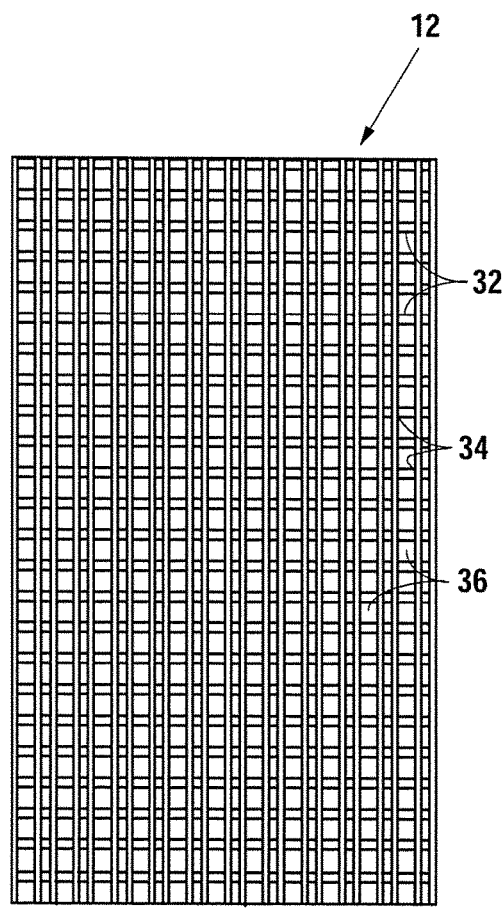
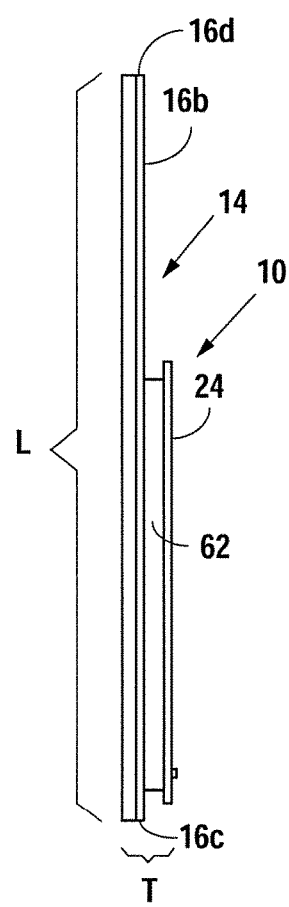
Fig. 1
Fig. 2
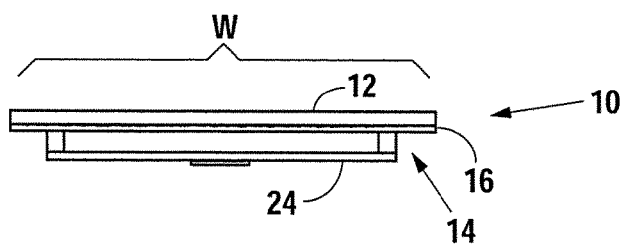
Fig. 3

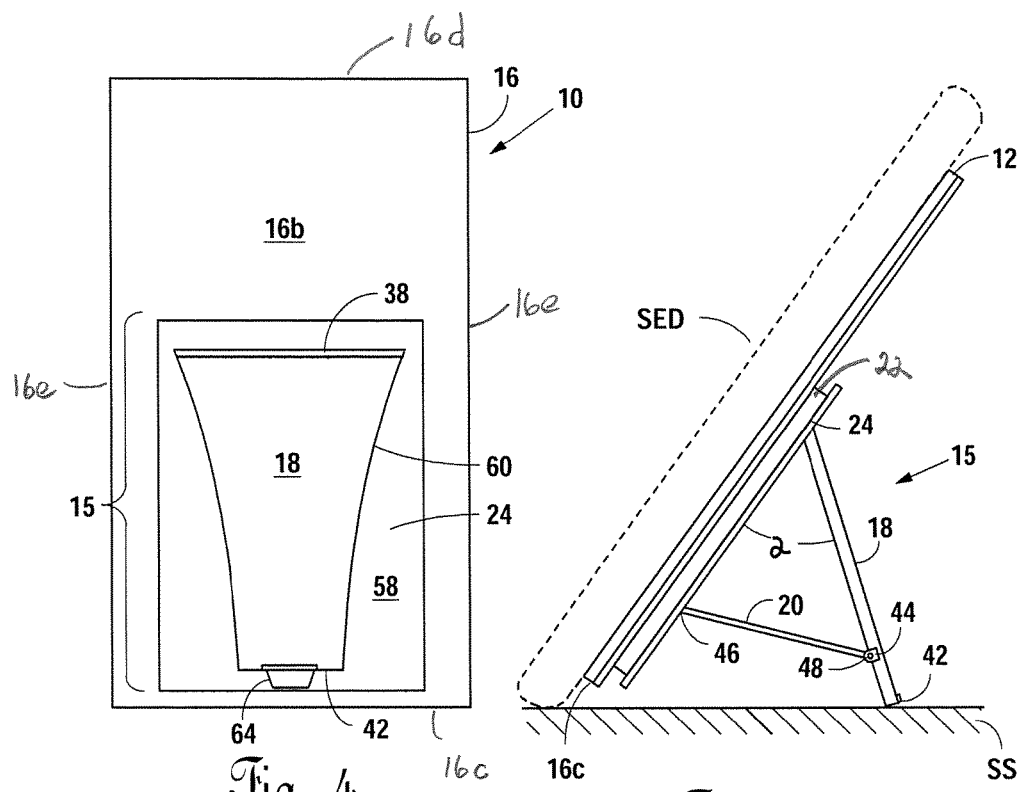
Fig. 4
Fig. 5
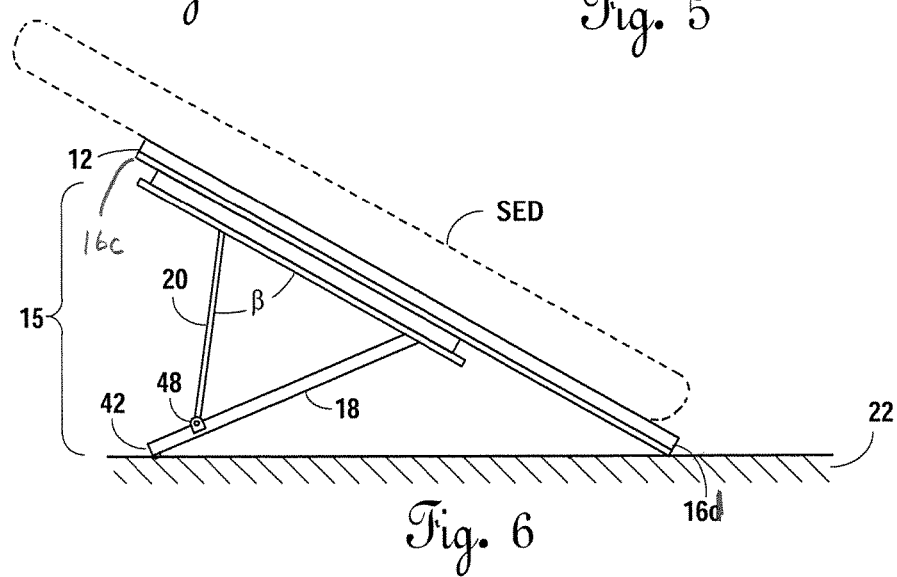
Fig. 6

SUPPORT ASSEMBLY FOR ENGAGING A SMALL ELECTRONIC DEVICE

This application claims priority to and the benefit of and incorporates by reference US Application Nos. 62/298,669, filed Feb. 23, 2016; and 62/299,190, filed Feb. 24, 2016.

FIELD OF THE INVENTION

Support assemblies for holding small electronic devices on a horizontal support surface.

BACKGROUND

Small electronic devices, such as smart phones, phablets, e-readers, iPhones, mini iPads or tablets are tabular and typically run in the range of about 2"-8" in width, about 4"-11" in length, and about 0.20"–0.60" in height, and typically weigh between about 3 and 24 ounces in weight.

They are typically carried in the pocket, purse or in a case that engages a belt or by other suitable means. Often, when they are removed from the pocket of a seated user, they are placed on a horizontal support surface such as a desk or table, and manipulated or viewed. A tilted stand makes it useful to read or observe what is on the device display.

Prior art stands have been provided to hold a small electronic device and they usually include a lip for engaging the lower end of the device (to prevent slide-off). Sometimes mechanical arms are provided to physically contact the sides or the top of the electronic device to prevent the device from sliding as may occur when the device is placed on a tilted surface, such as a stand. Sometimes support stands are part of a clip-on case; or maintain contact through use of an adhesive surface between the small electronic device and the stand.

Prior art stands have a number of shortcomings, including the limited ability to provide proper angular viewing and limited ability for engaging the support assembly at a variety of attitudes or angles. They also usually require some manipulation of the small electronic device with the stand to mechanically engage the two.

SUMMARY OF THE INVENTION

The support device disclosed is based on new and unique concept. Its use, instant viewing angle change, and easy pocket storage are the result of an electronic device and the support device combining to essentially form a unit. Current stands and support are generally of the following variety: (a) supports with which one object sits or leans against another (most static and adjustable phone stands), which allow only pre-defined viewing angles; (b) supports that have an adhesive surface to 'cling" to electronic devices, making adjustments possible only by breaking the seal formed by the adhering material; or (c) supports that either grip or adhere to electronic devices and have flexible necks, which are too large for a pocket and often require considerable effort to adjust comfortably.

This support device has no pre-defined viewing angles (viewing angle can be changed to any angle whatsoever, between the upper and lower limits based on the size of the electronic device); does not adhere (not tacky or sticky) to the electronic device, which allows immediate change of angle when desired; and is typically about a centimeter or less in thickness (or in another range, about ⅛" to ¾" or ⅛" to ⅜") when prepared for storage or carrying in a shirt pocket. This is possible because the upper surface of the support device maintains its position with respect to the back of an electronic device by friction between the two, achieving stability with minimal effort. A change of angle requires only moving the support device up or down against the back of the electronic device. With no adhesion or other chemical grip, the singular design allows for simple and quick changes of configuration, both in angle and orientation.

A support assembly for, in one embodiment, frictionally holding (without mechanical, adhesive, or clasping engagement) a small electronic device (sometimes hereafter "SED") between the support assembly and the small electronic device, at an acute angle between a horizontal support surface and a plane of the SED. The support assembly, in one embodiment, comprising an engaging face, including a resilient, soft pad having multiple raised portions, the resilient, soft pad having an upper surface and a lower surface and a perimeter. When the SED contacts the multiple raised portions comprising the top surface, it compresses them slightly to provide sufficient friction to hold the SED to the support assembly. A stand comprising a base and a pivoting leg assembly is provided. The base, in one embodiment, is for fixedly receiving the lower or bottom surface of the soft pad. The pivoting leg assembly may include a leg having a near and removed end, the near end pivotable with respect to the base between a closed position, wherein the leg is parallel to the base, and an open position wherein the leg is at an acute angle with respect to the base. A pivoting and sliding support arm, laying parallel to the leg and base in a closed position and angular (non-parallel) to the base and leg in an open position, is provided to maintain the open position of the pivoting leg.

A support assembly for holding a small electronic device on a horizontal support surface, the support assembly comprising: a soft, resilient, non-adhesive pad having a perimeter and an upper and lower surface, the pad having multiple upstanding lands or raised areas, the lands or raised areas comprising the upper surface of the pad, the same height above the lower surface pad; and a stand comprising a base with an upper surface, a lower surface, and a perimeter, and a pivoting leg assembly, the base for fixedly receiving the lower surface of the pad, the pivoting leg assembly adapted to engage the base and a support surface when in an open position and for folding flat against or adjacent the base in a closed position.

A support assembly for holding a small electronic device on a horizontal support surface, the support assembly comprising: a resilient, soft pad having a upper surface comprised of multiple raised lands, the resilient soft pad having and a lower surface and a perimeter; and a stand comprising a tabular base and a support leg assembly, the base for fixedly receiving the lower surface of the resilient, soft pad; wherein the support leg assembly includes a pivot leg having a near end removed end, the near end pivotable with respect to the base between a closed position, wherein the pivot leg is parallel to the base, and an open position wherein the pivot leg is at an angle with respect to the base; and wherein the support leg assembly also includes a pivot and sliding arm, laying parallel to the leg and base in a closed position and angular to the base and leg in an open position.

A support assembly for holding a small electronic device on a horizontal support surface, the support assembly comprising: a resilient, soft pad having multiple raised portions comprising the resilient, soft pad having an upper surface comprising the multiple raised portions and a lower surface and a perimeter; and a stand comprising a base and a support leg assembly, the base for fixedly receiving the lower surface of the soft pad; wherein the support leg assembly includes a pivot leg having a near end removed end, the near end pivotable with respect to the base between a closed position, wherein the pivot leg is parallel to the base, and an open position wherein the pivot leg is at an angle with respect to the base; and wherein the support leg assembly also includes a pivot and sliding arm, laying parallel to the leg and base in a closed position and angular to the base and leg in an open position; wherein the pivot leg is an open position makes an angle of between 15° and 40° with the plane of the base when in the open position; wherein the support assembly has a thickness of less than about ¾ inch with the base in the closed position; wherein the durometer of the upper surface is in the range of 10 Shore-000 to 80 Shore A; and wherein the soft, resilient pad has a total area in the range of about 4.5 to 18.0 square inches and the raised areas comprising the upper surface comprises between about 25% and 75% of the total area.

BRIEF DESCRIPTION OF THE DRAWINGS

FIG. 1 is a top view of resilient pad of the small electronic device support assembly.

FIG. 2 is a side elevational view of the small electronic device support assembly in a closed position.

FIG. 3 is an end view of the small electronic device support assembly in a closed position.

FIG. 4 is a rear elevational view of the small electronic device support assembly in a closed position.

FIG. 5 is a side view of the small electronic device support assembly with a support leg in an opened position and the assembly at a first attitude with respect to a support surface SS with the SED in a portrait position.

FIG. 6 is a side view of the small electronic device support assembly with a support leg in an opened position and the assembly at a second attitude with respect to a support surface SS with the SED in a landscape position.

DETAILED DESCRIPTION OF PREFERRED EMBODIMENT

Applicant provides a small electronic device support assembly. The support assembly includes a stand having a base and a support leg assembly engaging the base. On the top face of the base is provided a soft, resilient, non-slip pad. The soft, resilient non-slip pad has multiple high points defining a top or upper surface, the multiple high points spaced apart from one another such that there are typically dozens or even hundreds of multiple high points for engaging the bottom surface of the electronic device. In other words, the pad, affixed to the base, does not have a smooth top surface, but instead defines multiple soft projections or raised points spaced apart from each other which contact the underside of the small electronic device at hundreds or even thousands of points. Also, the support leg assembly is foldable against the underside of the base and, being foldable, provides a low profile. The low profile allows one to easily slip the support assembly into a pocket. Further, the support leg assembly is configured so that the stand can be placed upon a support surface at both an upright "steep" tilt position or an upright but "shallow" tilt position for optimal viewing by the user. The stand can also be placed "sideways" on a support surface, instead of upright.

Figure 1A:
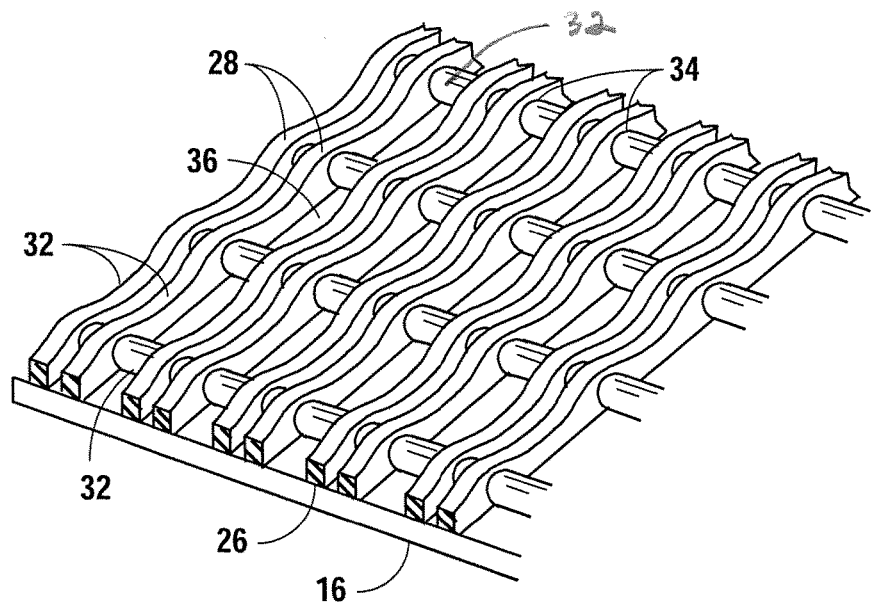
FIGS. 1A and 1B are perspective and cutaway views of the resilient pad of FIG. 1.
Figure 1B:
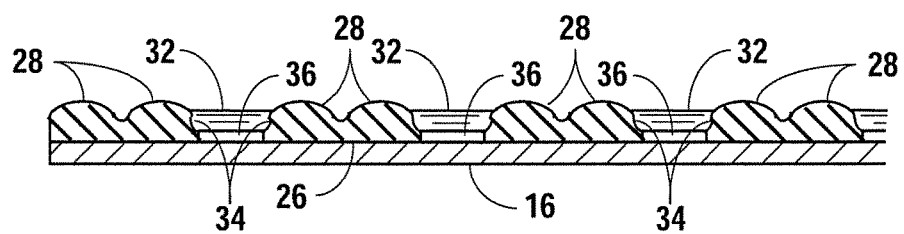
Figure 7:
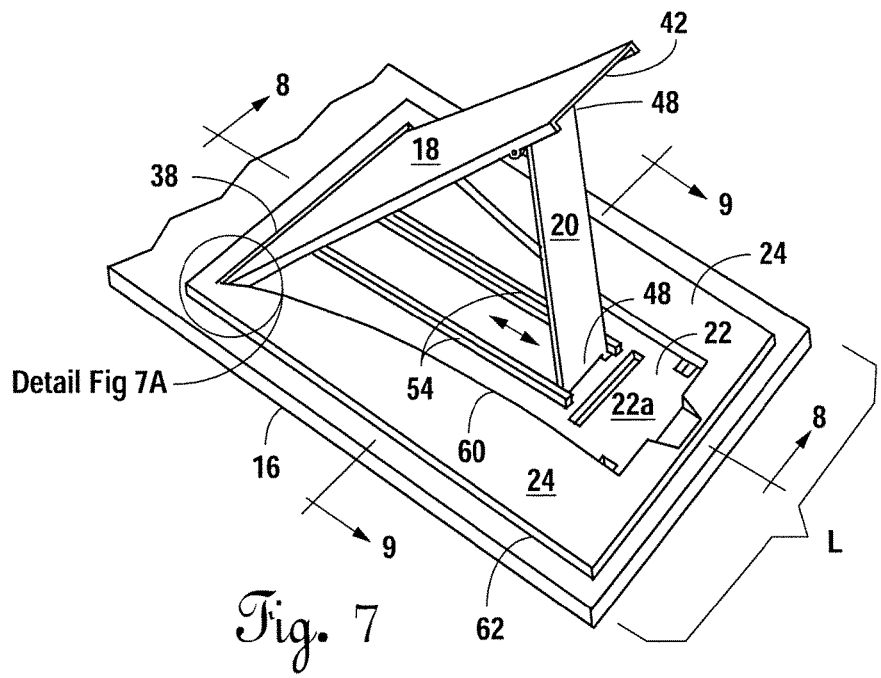
FIG. 7 is a perspective view of the rear of the small electronic device support assembly with the leg in an opened position.

Applicant provides a small electronic device support assembly 10 comprising, in one embodiment, a stand 14 with a base 16, the base to receive a resilient, soft pad 12. In one embodiment, a "waffle" or grid-like pad 12 (FIGS. 1-9) has a bottom surface 26, a top surface 28 and, in some embodiments, an intermediate surface 30. Strands 32 are provided connecting thicker junctions or joints 34, the strands and junctions or joints typically sometimes defining multiple openings in the pad voids 36. Bottom surface 26 is typically flat. The strands may be thinner, meeting at junctions or joints 34, which may be raised as seen in FIGS. 1A and 1B. The tops of the junctions or joints 34 comprise the top surface 28 of the pad and, in some embodiments, the tops of strands 32 comprise an intermediate surface 30 of the pad, which is below top surface 28 and above the bottom surface 26.

Pads, see FIGS. 1, 1A, 1B, 10, 10A, 11, 13, 15 and 16 all contain a top surface that contacts the bottom surface of the SED at many—typically about 30 to 500 or more small high points or areas. Each point or contact area is soft and resilient and has a little give when the SED is placed on the pad.

The pad is typically between about 3.0" to 5" in length and about 1.5" to 2.5" wide. The thickness is in the range of approximately 0.1" to 0.25", but any suitable dimensions may be used. The pad, in one embodiment, may be a single composition throughout, molded or extruded, and is typically resilient and soft. In one embodiment, it is foam. The foam may be open cell, closed cell or a combination of open and closed cell. In the weight range indicated (about 4 to 24 ozs.), there is very slight compression of the pad (in order of magnitude of single digit mils, about 0.1 to 0.3 mils in one embodiment) when the device and stand are lying flat on a support surface with the SED placed on top of the pad, a barely discernable compression. In one embodiment, the spaces between the high areas represent about 33-45% percentage preferred range of the total area of the pad when viewed from above. In another embodiment, the range is 25-75%. Sources of pad material are Kittrich Corp., Ponoma, Calif., Magic Cover Grip®, a plastic non-skid shelf liner material. Another pad material is Magic Stop® non-slip indoor rug pad.

Top surface 28 of pad 12 is adapted to give slightly when SED is placed on small electronic device support assembly 10 as seen in FIGS. 5 and 6, and to provide sufficient frictional grip to prevent the sliding of the back surface of the SED across the pad.

Stand 14 includes stand base 16 and a support leg assembly 15. The pad usually covers the upper surface of the base. Stand 14 is designed to support pad 12 (in one embodiment, the pad may be glued to the base with a suitable adhesive). Support assembly 10 has the ability to assume the closed configuration (leg support assembly 15 closed) as seen in side view of FIG. 2, the closed configuration having a "low profile," typically meaning a thickness in the range of about 0.23" to 0.29" in one range (about 0.20' to 0.40" in another range), while being able to achieve an opened position (leg support assembly 15 open) as seen in FIGS. 5 and 6. The viewing angle is the smaller angle between the plane of the tabular SED when on the stand and the plane of the horizontal SS. In one embodiment, the open position allows the support assembly 10 to lay in a first attitude with a steep tilt as seen in FIG. 5 or, in a second attitude, with a shallow tilt as seen in FIG. 6. The "steep tilt configuration", may use the lower edge (lower with respect to a support surface) of the SED as a stand support surface (see FIG. 5). The two attitudes do not require a change in the pivot leg angle, but allow the user to choose a steep or shallow viewing angle by flipping the stand so lower edge/upper edge of stand base change. Thus, a first edge (16c in FIG. 5) may be the lower edge in a steep tilt position and the upper edge in a "shallow" configuration (16c in FIG. 6, where second edge 16d is lower with respect to the support surface). A second edge 16d is opposite the first edge 16c. There is a pair of spaced apart side edges 16e. The shallow viewing configuration angle may be between about 20 and 30 degrees, the steep viewing angle may be between about 35 and 45 degrees.

Figure 8:
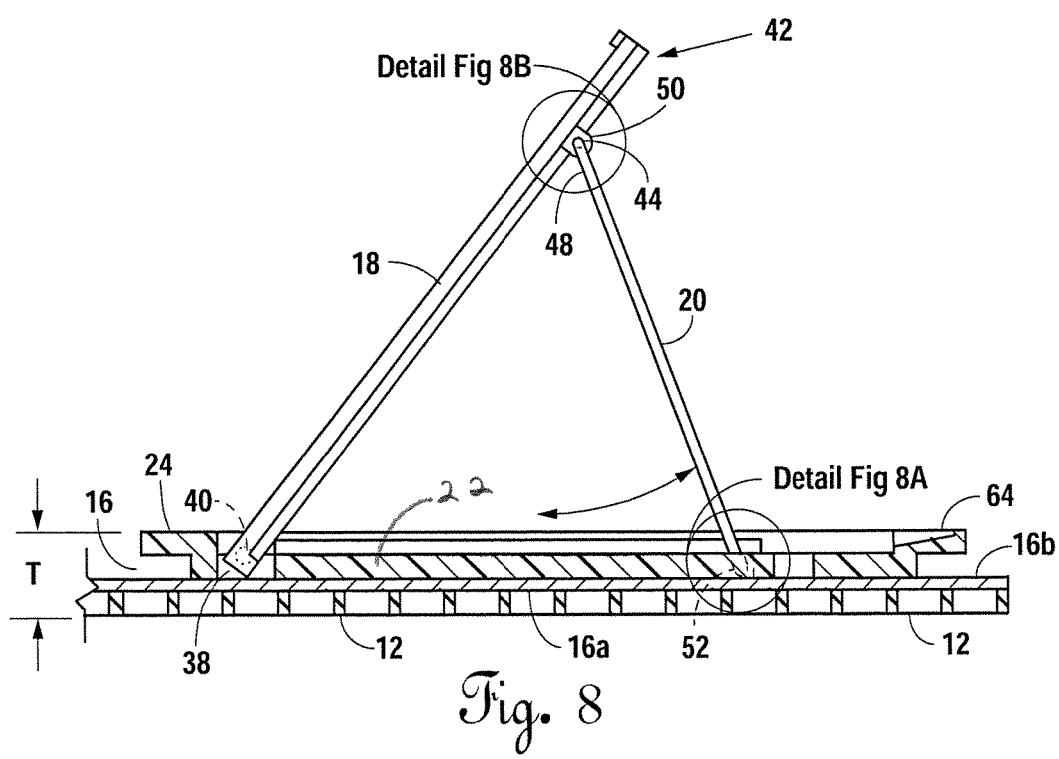
FIG. 8 is a partial side view of FIG. 7 cut away.
Figure 7A:
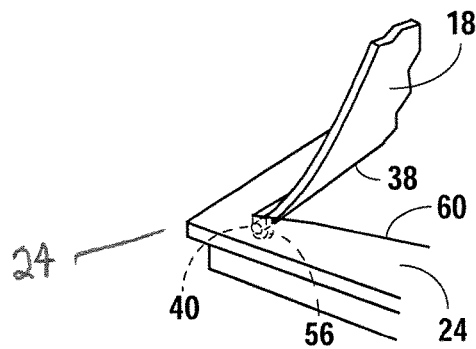
FIG. 7A is a partial view of FIG. 7 showing details of the structure providing for the pivoting of the leg.
Figure 8A:
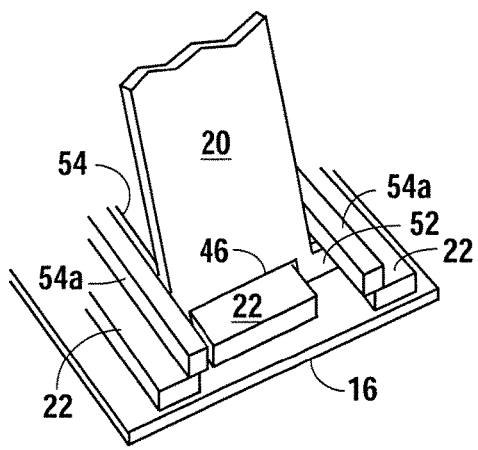
FIG. 8A is a partial view in perspective of FIG. 8 showing details of the structure providing for the arm to slide with respect to a track plate.
Figure 8B:
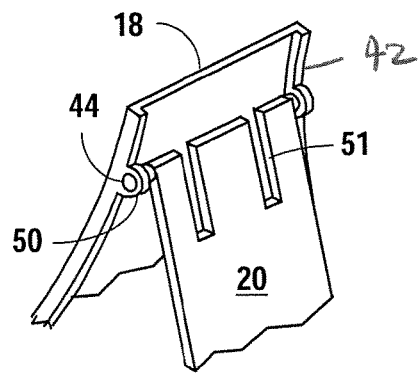
FIG. 8B is a partial view of FIG. 8 showing details of the structure providing for the arm to pivot with respect to the leg.
Figure 9:
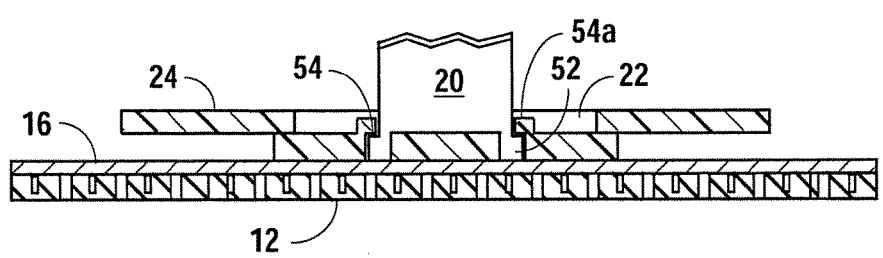
FIG. 9 is a cutaway view of the section shown in FIG. 7.

As seen in FIGS. 4-9, stand 14 is seen to comprise support leg assembly 15 and stand base 16 configured to receive pad 12. The stand usually has about the same length or width dimensions or length and width dimensions that might be slightly greater than the pad and a thickness, in one embodiment, of about 0.05" to 0.07". Base 16 has a top surface 16a, a bottom surface 16b, a first edge 16c, and a second edge 16d and two side edges 16e. The base and other parts of the stand may be made of a material, such as molded high-density polyethylene plastic. Engaged with the base, in one embodiment, is support leg assembly 15, having a pivot leg 18, having a near end 38 and a removed end 42. Near end 38 has support and pivot stubs 40 (or an axle) (FIGS. 7A and 8) and the removed end 42 has brackets 44 (to receive fingers 50) at the lateral edges of the pivot leg as seen in FIGS. 8, and 8B. Brackets 44 receive a rigid, slidable pivot arm 20. Removed end 42 of pivot leg 18 engages support surface SS as seen in FIGS. 5 and 6 (upright) and in a side edge or sideways configuration (see FIG. 11A). Pivot leg 18 may, in one embodiment, assume an angle α with respect to the plane of base 16 in the range of about 20° to 50° (see FIG. 5) or, in another preferred range, about 15° to 40°, and another about 25° to 30°.

Pivot arm 20 is typically rigid enough to support the weight, applied by pivot leg 18, but allows flex at slots 51 to allow for fingers 50 to pivotally engage brackets 44 (see FIG. 8B, an axle may be used here instead of fingers). Pivot arm 20 is adapted to pivot and slide with respect to base 16 and pivot with respect to pivot leg 18. Pivot arm 20 includes fingers 50 at a removed end thereof for pivotally engaging the brackets of the pivot leg (See FIG. 8B) and slideably engages stand base 16 at near end 46 thereof through feet 52 (see FIG. 8A) in captured in a track plate 22.

Track plate 22 includes a top surface 22a and, typically, a pair of track grooves 54. Track grooves 54 may have upstanding lands 54a designed to slideably capture feet 52 of near end 46 of pivot arm 20 as seen in Detail FIG. 8A. Brackets 56 on the track plate (may also be on housing 24 or bottom surface 16b of stand base 16 or any other suitable place) are adapted to locate near end 38 of pivot leg 18 across an upper edge of housing 24 as removed end 48 slides as seen by the arrows in FIGS. 7 and 8 to move or pivot the pivot leg to an out or open position. This will hold rigidly, without collapsing, leg 18 and arm 20 in the position seen in FIGS. 8, 15 and 16, when removed end is at the stop position in the tracks (see FIG. 7).

Housing 24 may be provided with a top wall 58, top wall 58 having a cutout 60. Housing 24 in one embodiment may receive track plate 22 therein and the cutout is dimensional to receive pivot leg 18, such that in a closed position as seen in FIG. 2, the top surface of the pivot leg is about flush with the top wall of housing 24. Housing 24 may have side walls 62 and a resilient tab 64 for engaging removed end 42 of pivot leg to hold it in a closed position, but for slight finger pressure to allow the pivot leg removed end 42 to pivot away from the base when moving from closed position (FIG. 2) to opened position (FIGS. 5 and 6). Angle β, provided to keep pivot leg 18 from collapsing while being in either attitude FIG. 5 (steep) or FIG. 6 (shallow), may be in the range of about 35° to 45° or 20° to 60°.

In some embodiments, the top surface of support assembly 10 may have the following length and width dimensions (see FIGS. 2 and 3) (with the pad comprising substantially all of the top surface):

|  | Length Range (about) | Width Range (about) | Weight of SED Range (approx.) | Typical Minimum Covered Area Frictional Engagement |
| --- | --- | --- | --- | --- |
| Small electronic devices, such as: phablets, smart phones, iPhones | 4"-6.5" | 2"-3.8" | 3-9 oz. | greater than about 15% total pad area |
| Small electronic devices, such as: small tablets (screen 7"-8") | 6.5"-8.5" | 3.8"-5.5" | 9-14 oz. | greater than about 15% total pad area |
| Small electronic devices, such as: medium tablets (screen size >8") | 8"-11.5" | 5"-7.5" | 10-24 oz. | greater than about 15% total pad area |

Figure 10:
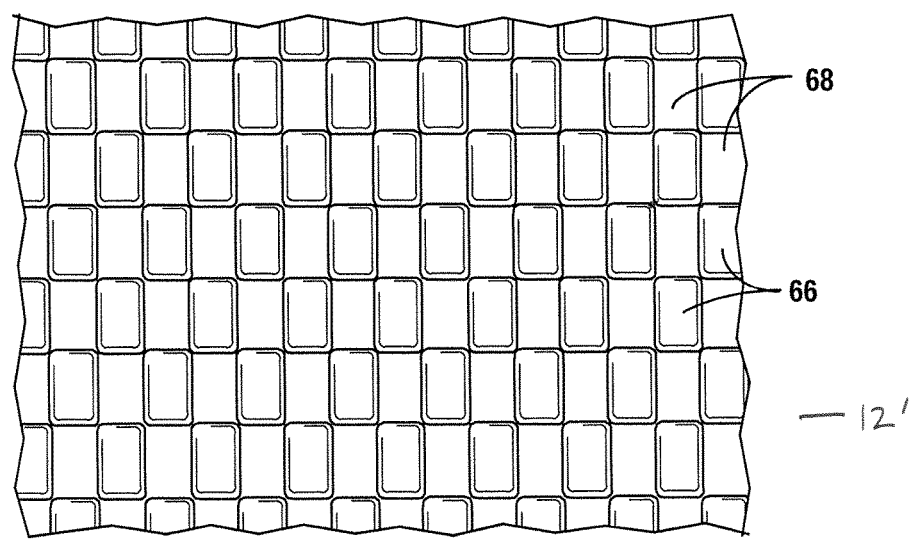
FIGS. 10 and 10A illustrate two views top and perspective of a second embodiment of a pad.
Figure 10A:
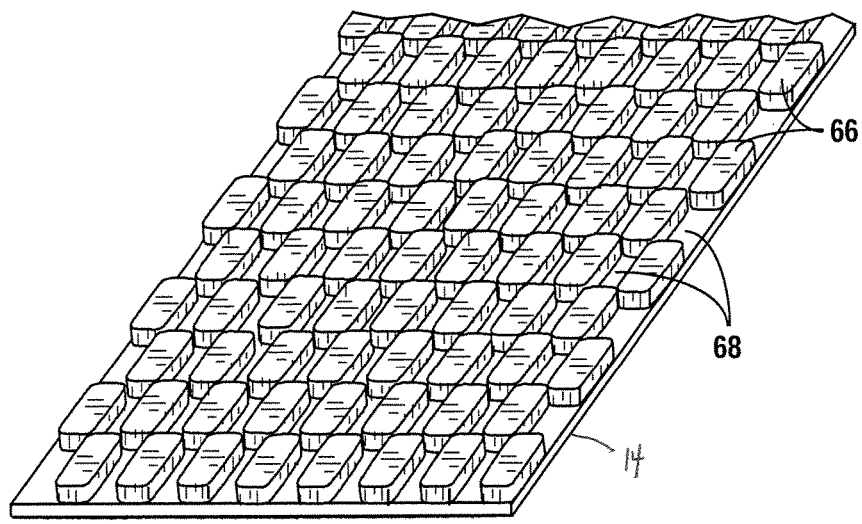

FIGS. 10 and 10A illustrate a second embodiment 12' of pad, wherein there are no strands, just a grid (that is, a resilient pad having typically, uniform voids) with soft, resilient blocks 66 and voids 68. The corners of the regular, rectangular, soft blocks are engaged so as to connect with adjacent blocks and to define voids. In this example, the area of the voids, when viewed from the top, is about 40-50% of total area, but may be in the range of about 30-70%. In some embodiments, the softness of the material may be type 000 and range, for example, from about 10 to about 100 (open cell foam, for example, or sponge rubber). Hardness may be in the range of 00 (for example, about 40 to 100) or type 0 (about 10 to about 90) durometer. In another embodiment, the hardness may be in the range of 10 Shore A to about 80 Shore A.

Figure 11:
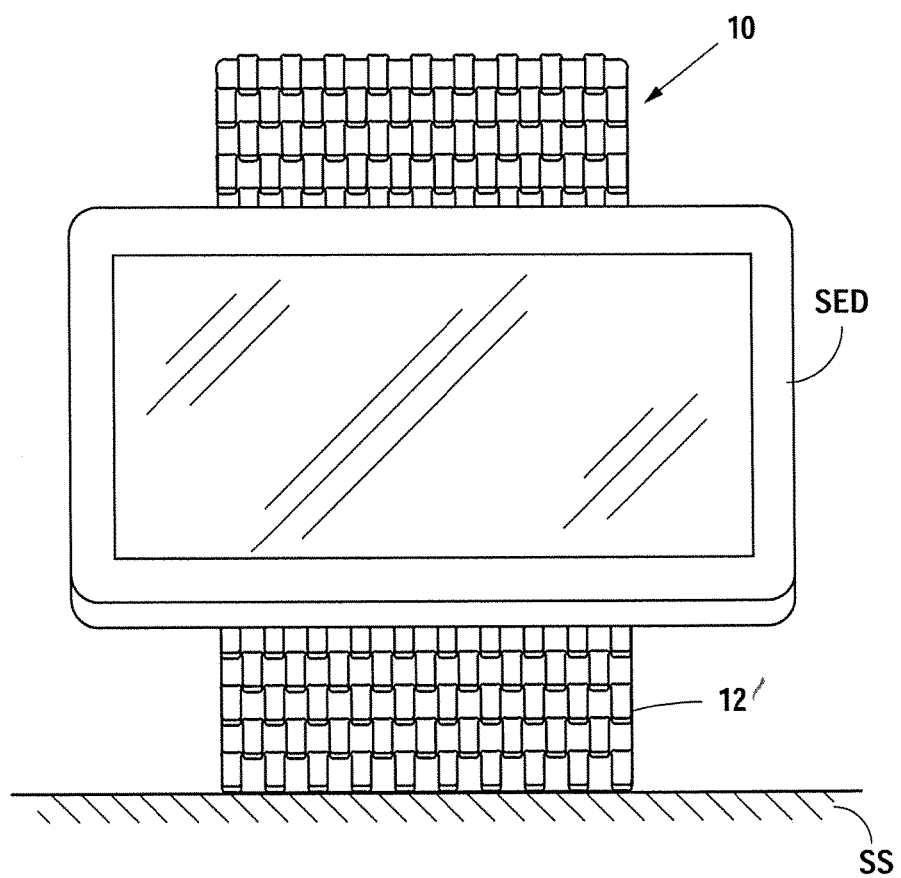
FIG. 11 shows the support assembly holding a SED in a "landscape" orientation.

FIG. 11 illustrates that SED may also assume a "landscape" orientation with respect to support assembly 10 when the covered area (rear surface of SED covered to total area of pad) is above minimum range as set forth in the Table. The orientation of FIG. 5 is "portrait" orientation with covered area exceeding the about 15% minimum. Landscape orientation may include, as in FIG. 5 the use of a lower edge of the SED as a support edge contacting a support surface.

Figure 12:
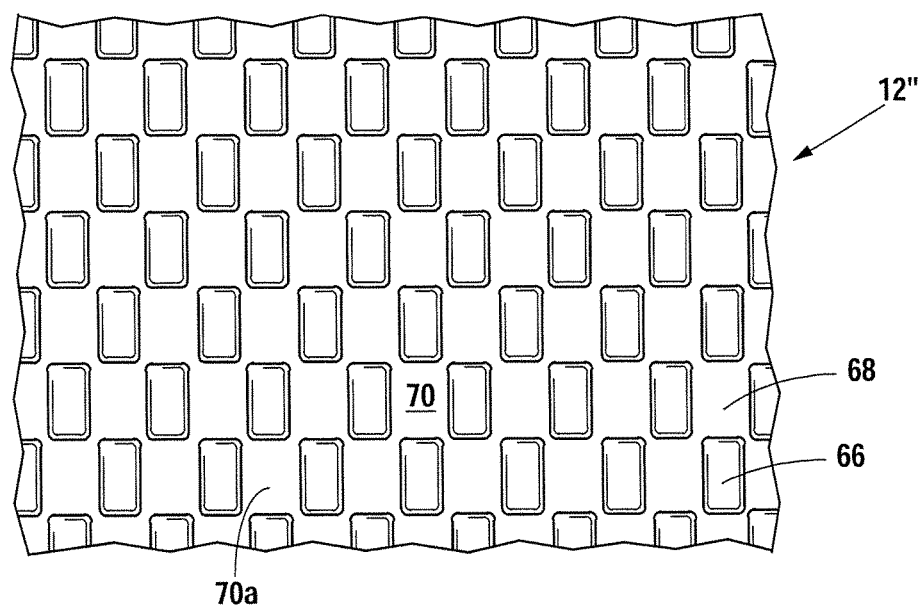
FIGS. 12 and 12A illustrate two views, top and perspective, of a third embodiment of a pad.
Figure 12A:
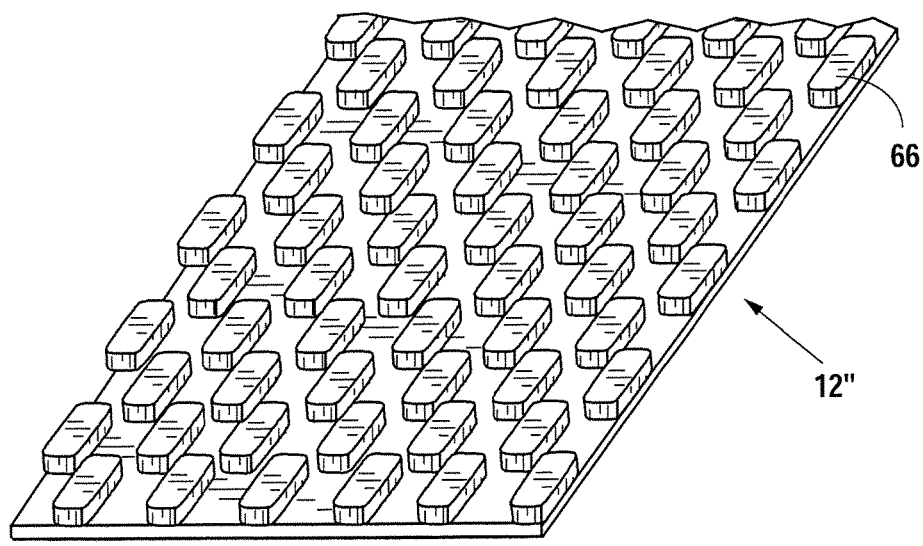
Figure 13:
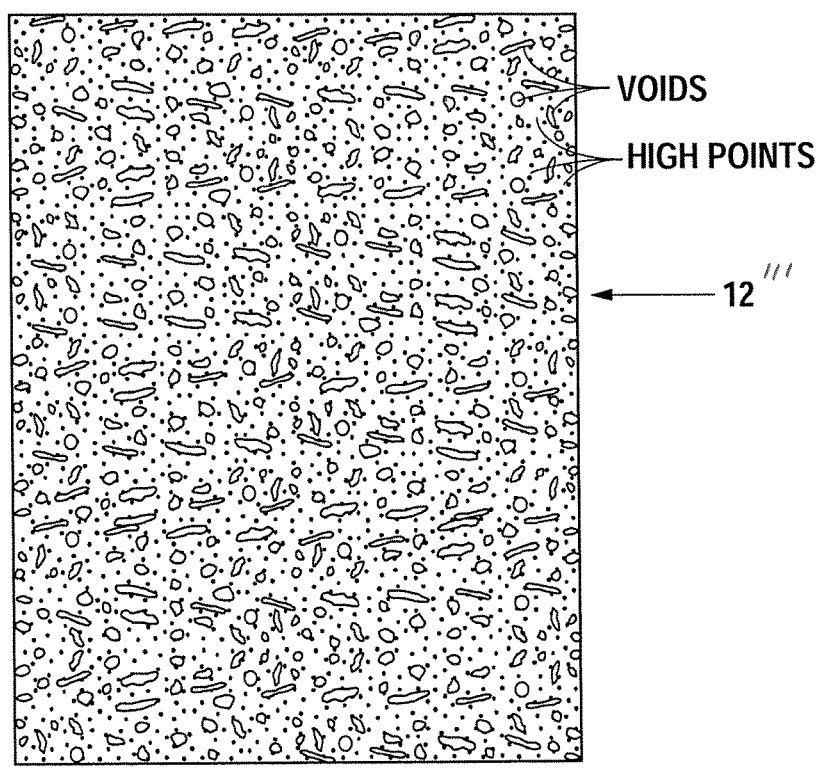
FIG. 13 is another embodiment of a pad for use with Applicant's SED support assembly.
Figures 14, 15:
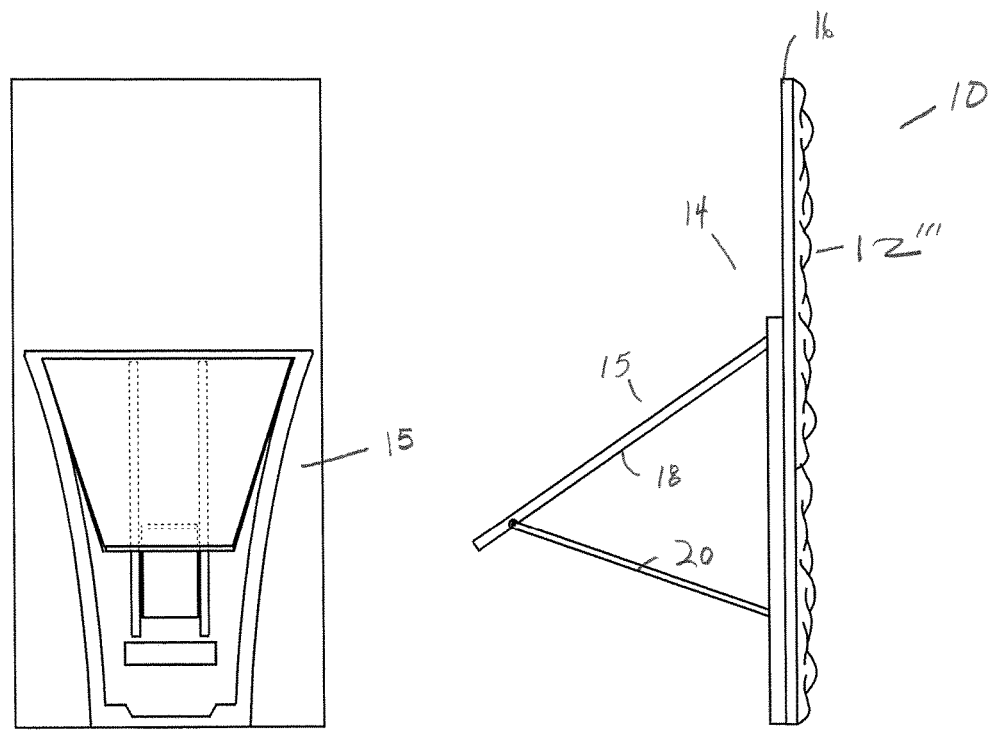
FIGS. 14, 15 and 16 show an additional embodiment of applicant's SED support assembly, including, in part, a pad such as that illustrated in FIG. 13.
Figure 16:
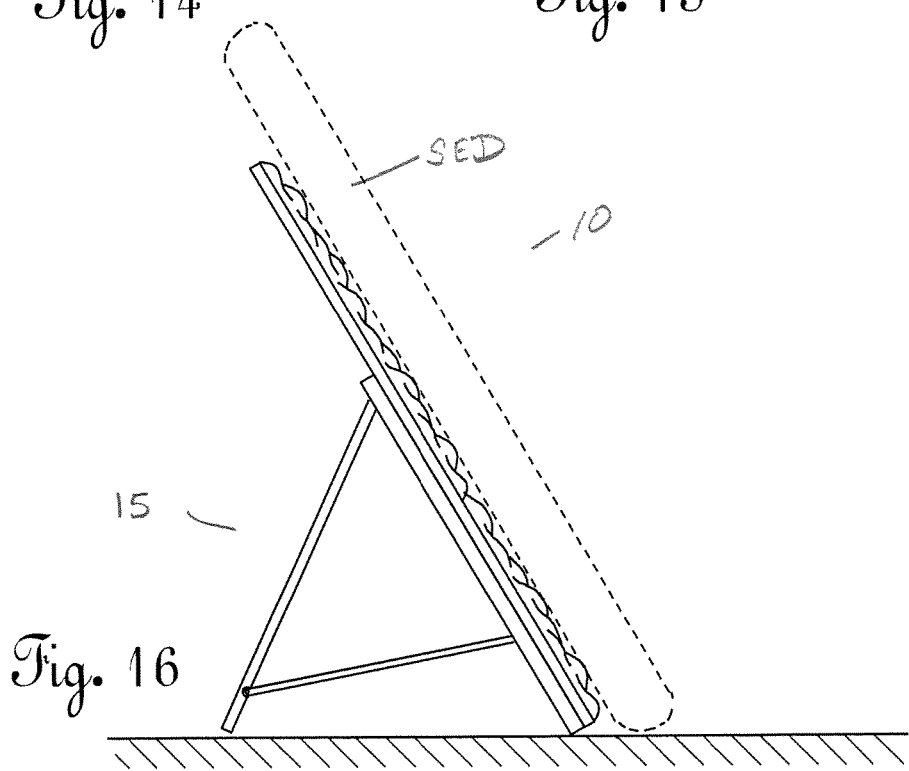

FIGS. 12 and 12A illustrate a third embodiment 12" of pad for use with Applicant's device, one in which voids 36/68 and junctions/blocks 34/66 have a pad base that they are integral with. Pad base 70 has an upper surface 70a from which integral junctions/blocks 66 rise up from. Pad base 70 is typically integral with upstanding blocks/junctions and is flexible, soft, and resilient. It is noted that all three pads have what may be termed lands or high areas (that contact the underside of the SED) 34/68, because they are separated voids or lower areas. Lands may be junctions or joints 34 when joined by strands or blocks 66 when joined to each other directly (pad 12') or joined to pad base 70 (pad 12").

Pad 12''' is more irregular than the grid-like or uniform pads, but still has multiple raised points separated by either voids or gaps, the high points for contacting the bottom surface of the SED. Like the high points or lands of the top surface, the high points are soft and elastomeric. However, they are not in the nature of adhesives and not sticky.

Figure 11A:
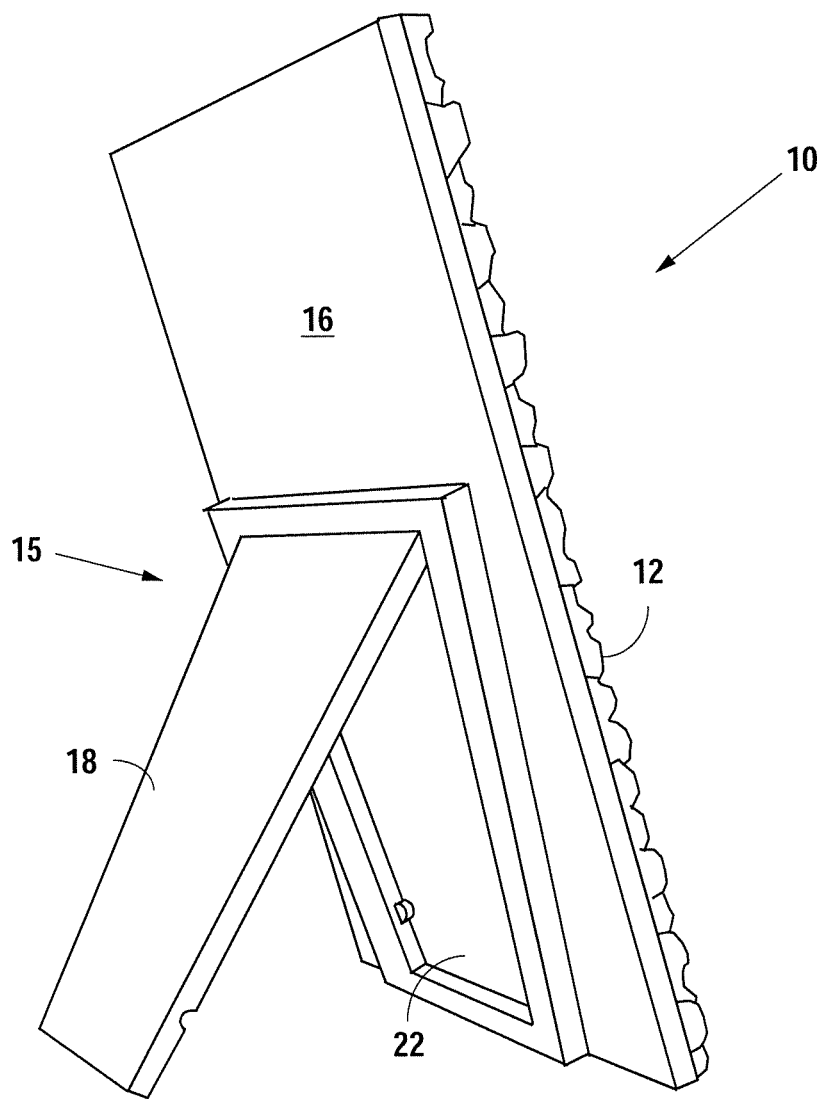
FIG. 11A is a perspective view of the support assembly in a "sideways" orientation with respect to a support surface.

FIG. 11A shows a "sideways" configuration in which the support stand is placed such that one of the side edges 16e is laid across the top of the support surface SS and the SED placed on the pad assumes an acute with respect to the support surface. This may be achieved configuring the pad as set forth herein above and in a preferred embodiment where the width of the removed end 42 of leg 18 is about ¼ in. to 2 inches less than the width of the stand. In some embodiments, the leg 18 length may be about 1-3 inches, and in another embodiment, 1 to 5 inches, with a width 1-3 inches at the widest point. While the embodiments illustrated feature pivoting leg assembly 15 at one end of stand base 16, as seen in FIG. 4, the pivoting leg assembly may also be placed at the other end or near the middle of the back of stand base 16.

Although the invention has been described in connection with the preferred embodiment, it is not intended to limit the invention's particular form set forth, but on the contrary, it is intended to cover such alterations, modifications, and equivalences that may be included in the spirit and scope of the invention as defined by the appended claims.

The invention claimed is:

1. A support assembly for removably receiving and holding a small electronic device having a viewing surface and a flat bottom surface in the same plane as the viewing surface, the support assembly comprising:
   a soft, resilient, non-skid pad having a perimeter and an upper and lower surface, the pad having multiple upstanding lands or raised areas, the lands or raised areas comprising the upper surface of the pad, and the raised areas about the same height above the lower surface of the pad; and
   a stand comprising a base with an upper surface, a lower surface, and a perimeter, and a pivoting leg assembly, the base for fixedly receiving the lower surface of the pad, the stand capable of being moved from a remote position and place upon a horizontal support surface when the pivoting leg assembly is in an open position and the pivoting leg assembly for folding flat against or adjacent the base in a closed position;
   wherein the base is dimensioned to removably receive the flat bottom surface of the small electronic device on the pad when the pivoting leg assembly is in the open and closed position; and
   wherein the pad is capable of frictionally supporting the small electronic device, when the pivoting leg assembly is in an open position, above and not contacting a lower edge of the stand.

2. The assembly of claim 1, wherein the support assembly has a thickness of less than about ¾ inch with the base in the closed position.

3. The assembly of claim 2, wherein the pad a length in the range of about 3" to 6" and a width in the range of about 1.5" to 3.0".

4. The assembly of claim 1, wherein the support assembly has a thickness of less than about ¾ inch with the base in the closed position and wherein a length in the range of about 3" to 6" and a width in the range of about 1.5" to 3.0".

5. The assembly of claim 1, wherein the durometer of the upper surface of the pad is in the range of about 10 Shore 000 to 80 Shore A.

6. The assembly of claim 1, wherein the soft, resilient pad has a total area in the range of about 4.5 to 18.0 square inches and the raised areas comprising the upper surface comprises between about 25% and 75% of the total area.

7. The assembly of claim 1, wherein the upper surface of the pad forms a regular grid.

8. The assembly of claim 1, wherein the upper surface of the pad forms an irregular pattern.

9. The assembly of claim 1, wherein the stand is configured to support a small electronic device in a steep or shallow angle on the horizontal support surface.

10. The assembly of claim 9, wherein the pivoting leg assembly includes a pivot leg and a pivot and sliding arm.

11. The assembly of claim 1, wherein the pad is foam.

12. A support assembly for holding a small electronic device having a viewing screen and a flat, bottom surface in the same plane as the viewing screen on a horizontal support surface, the support assembly comprising:
   a resilient, soft pad having a upper surface comprised of multiple raised portions, the resilient soft pad having and a lower surface and a perimeter; and
   a stand comprising a tabular base and a support leg assembly, the base for fixedly receiving the lower surface of the resilient, soft pad;
   wherein the support leg assembly includes a pivot leg having a near end removed end, the near end pivotable with respect to the base between a closed position, wherein the pivot leg is parallel to the base, and an open position wherein the pivot leg is at an angle with respect to the base; and
   wherein the support leg assembly also includes a pivot and sliding arm, laying parallel to the leg and base in a closed position and angular to the base and leg in an open position such that the base and the soft pad receive the flat surface of the small electronic device; and
   wherein the pad is capable of frictionally holding can hold the small electronic device, when the support leg assembly is in an open position, above a lower edge thereof and with the bottom surface of the small electronic device contacting only the upper surface of the pad.

13. The assembly of claim 12, wherein the pivot leg is an open position makes an angle of between 15° and 40° with the plane of the base when in the open position.

14. The assembly of claim 12, wherein the pivot and sliding arm makes an angle of between about 20° to 60° with the plane of the base when in the open position.

15. The assembly of claim 12, wherein the pivot leg is an open position makes an angle of between 15° to 40° with the plane of the base when in the open position and wherein the pivot and sliding arm makes an angle of between about 20° to 60° with the plane of the base when in the open position.

16. The assembly of claim 15, wherein the soft, resilient pad has a total area in the range of about 4.5 to 18.0 square inches and the raised areas comprising the upper surface comprises between about 25% and 75% of the total area.

17. The assembly of claim 15, wherein the durometer of the upper surface is in the range of about 10 Shore 000 to 80 Shore A.

18. The assembly of claim 15, wherein the stand is configured to support a small electronic device in a steep or shallow angle on the horizontal support surface.

19. The assembly of claim 12, wherein the pivot leg is an open position that makes an angle of between 15° and 40° with the plane of the base when in the open position.

20. A support assembly for holding a small electronic device having a flat surface on a horizontal support surface, the support assembly comprising:

a resilient, soft pad having multiple raised portions comprising the resilient, soft pad having an upper surface comprising the multiple raised portions and a lower surface and a perimeter; and a stand comprising a base and a support leg assembly, the base for fixedly receiving the lower surface of the soft pad;

wherein the support leg assembly includes a pivot leg having a near end and a removed end, the near end pivotable with respect to the base between a closed position, wherein the pivot leg is parallel to the base, and an open position wherein the pivot leg is at an angle with respect to the base;

wherein the base and the support leg assembly are dimensioned to receive the flat surface of the small electronic device on the pad when the support leg assembly is in the open and closed position;

wherein the pad can frictionally support the small electronic device, when in an open position, above and not contacting a lower edge thereof;

wherein the support leg assembly also includes a pivot and sliding arm, laying parallel to the leg and base in a closed position and angular to the base and leg in an open position;

wherein the pivot leg is an open position makes an angle of between about 15° and 40° with the plane of the base when in the open position;

wherein the support assembly has a thickness of less than about ¾ inch with the base in the closed position;

wherein the durometer of the upper surface is in the range of about 10 Shore 000 to 80 Shore A; and wherein the soft, resilient pad has a total area in the range of about 4.5 to 18.0 square inches and the raised areas comprising the upper surface comprises between about 25% and 75% of the total area.

\* \* \* \* \*